Sept. 15, 1953  J. W. SIMS  2,651,848
LEVEL
Filed Aug. 2, 1948  2 Sheets-Sheet 1

Inventor
Jack W. Sims
By Clarence A. O'Brien
and Harvey B. Jacobson
Attorneys

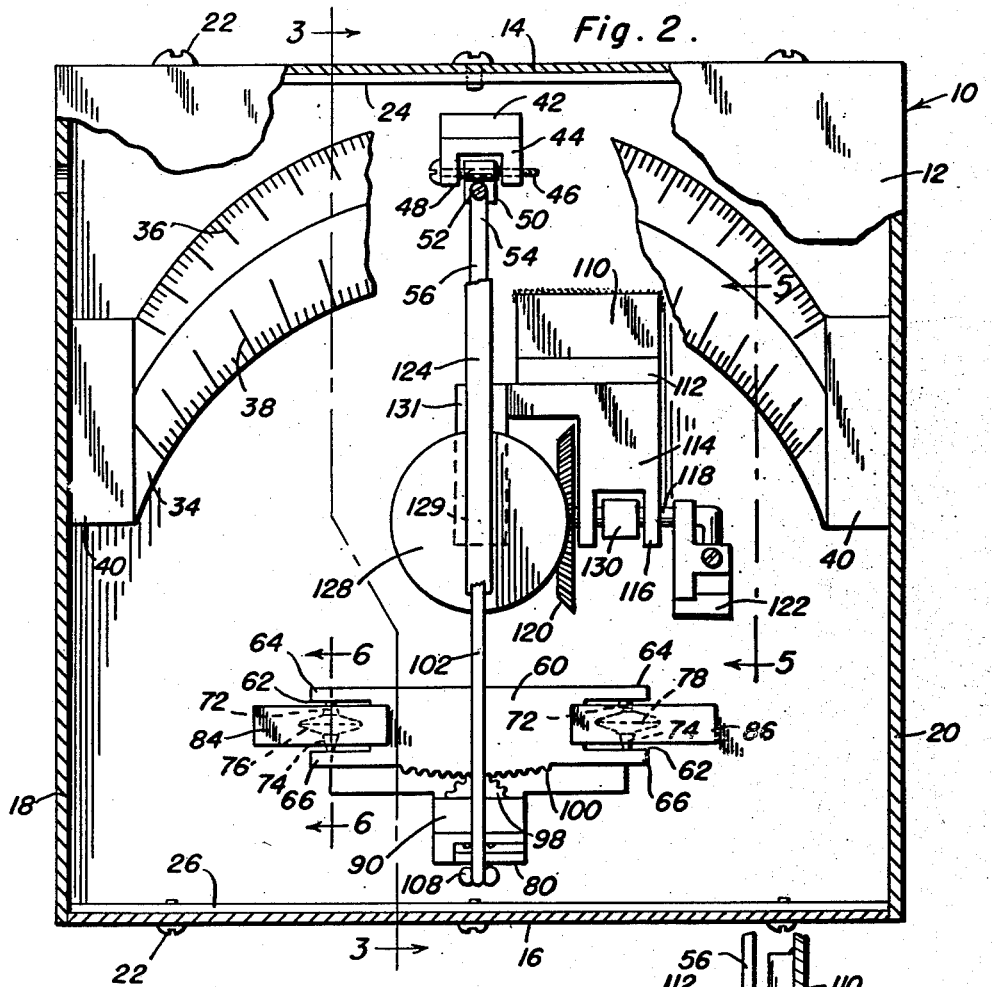
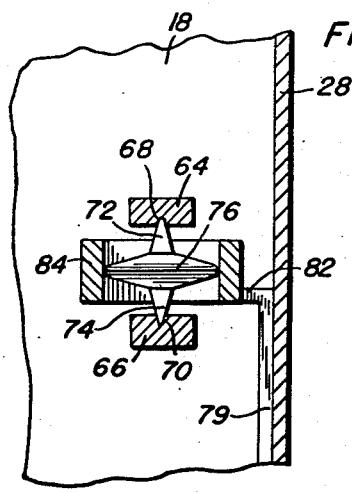
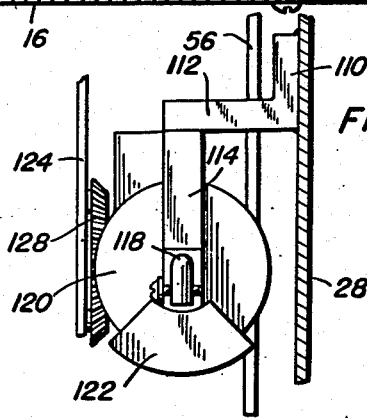
Jack W. Sims

Patented Sept. 15, 1953

2,651,848

UNITED STATES PATENT OFFICE 2,651,848

LEVEL

Jack W. Sims, New York, N. Y.

Application August 2, 1948, Serial No. 42,087

4 Claims. (Cl. 33—215)

This invention relates to new and useful improvements in levels and the primary object of the present invention is to provide a device for indicating the rolling or dipping movement of a ship or the like.

Another object of the present invention is to provide a level indicator for ships and the like including a pair of pointers adapted to register with a graduated plate and embodying novel and improved means for actuating one of the pointers upon dipping movement of the ship and for actuating the other pointer upon rolling movement of the ship.

Another object of the present invention is to provide a device for indicating the dipping and rolling movement of a ship including a pointer for registering with a graduated plate and a novel and improved pendulum responsive to movement of the ship for actuating the pointer.

A further object of the present invention is to provide a level attachment for ships that is extremely small and compact in structure and which includes elements that are quickly and readily assembled or disassembled facilitating the convenient inspection, replacement or adjustment of parts.

A still further aim of the present invention is to provide a device for indicating the dipping and rolling movement of a ship that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a front elevational view of the present invention, and with parts thereof broken away and shown in section;

Figure 5 is a vertical sectional view taken substantially on the plane of section line 5—5 of Figure 2; and, Figure 6 is an enlarged vertical sectional view taken substantially on the plane of section line 6—6 of Figure 2.

Figure 1:
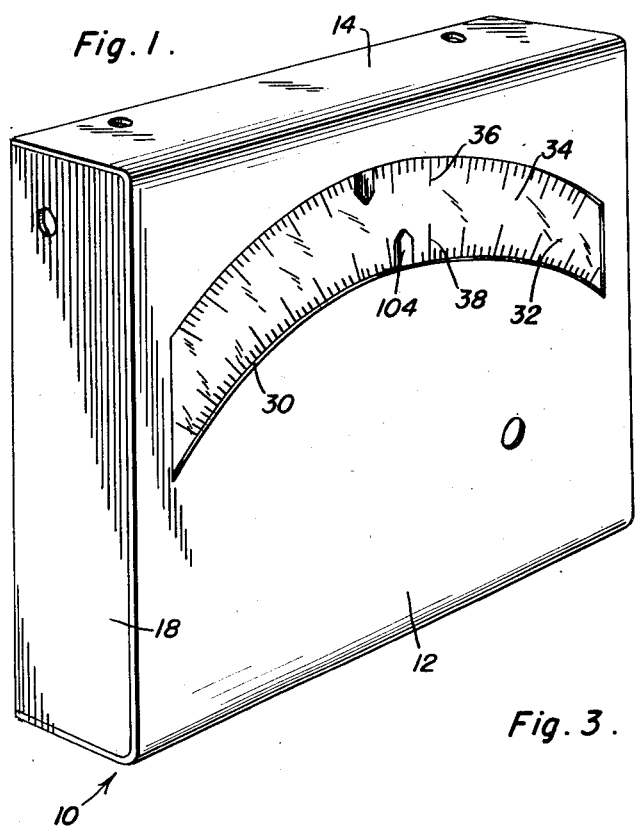
Figure 1 is a perspective view of the level mechanism constructed in accordance with the present invention.
Figure 3:
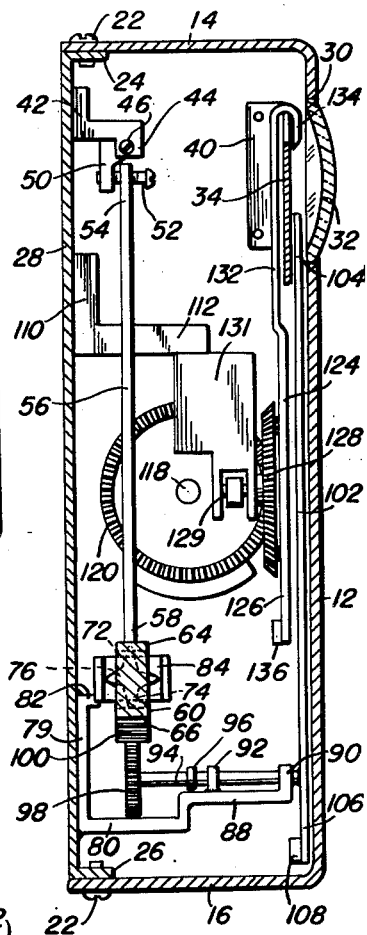
Figure 3 is a sectional view of the present level mechanism taken substantially on the plane of broken section line 3—3 of Figure 2.
Figure 4:
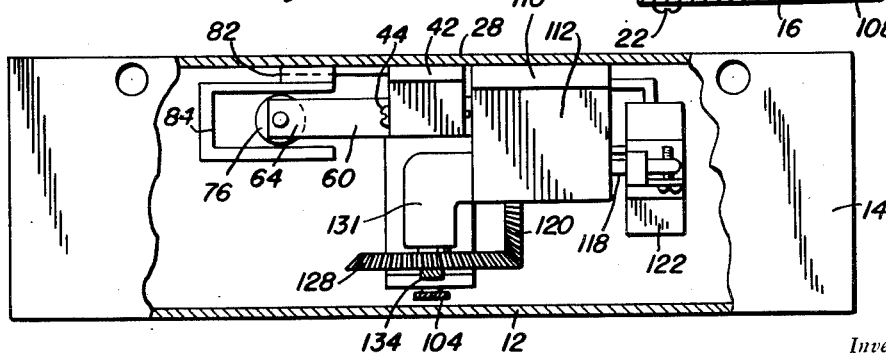
Figure 4 is a top plan view of the present level mechanism, and with parts thereof broken away and shown in section.

Referring now to the drawings in detail, wherein for the purpose of illustration, there is disclosed a preferred embodiment of the present invention, the numeral 10 represents a substantially box-like casing of any suitable material generally, comprising a substantially rectangular forward wall 12 having its sides turned inwardly to provide an upper wall 14, a lower wall 16, and side walls 18 and 20. The upper wall 14 and lower wall 16 are removably secured by fasteners 22 to the inturned upper and lower edges 24 and 26 of a rear wall or closure 28.

The forward wall 12 is formed with an arcuate window opening 30 the edges of which are fixed to the edges of an arcuate, elongated, concavo-convexed, transparent closure or window pane 32.

Spaced from the inner face of the window pane 32, is an arcuate, graduated plate 34 having an upper row of graduations or indicia 36, and a lower row of graduations or indicia 38 that register with the window pane 32. The ends of the plate 34 are turned outwardly to provide angulated attaching flanges 40 that are suitably secured to the inner faces of the side walls 18 and 20 adjacent the upper wall 14.

Rigidly secured by welding or the like to the inner face of the rear wall 28, adjacent the upper inwardly turned edge 24 thereof, is an angulated support member 42 having a depending bifurcated extension 44 that removably supports a pivot pin 46. Pivotally mounted on the pin 46, is the eye end portion 48 of an angulated link 50 that is bifurcated to adjustably and removably support a substantially horizontal pivot pin 52. This latest pivot pin 52 loosely engages a suitable aperture in the upper end 54 of a pendulum or swingable depending arm 56, the lower end 58 of which is rigidly secured to a lower weight or substantially rectangular bar 60.

The ends of the bar 60 are bifurcated as at 62, to provide upper and lower furcations 64 and 66. These furcations 64 and 66 are provided with opposed seats or depressions 68 and 70 that rotatably engage the pointed extremities of conical projections 72 and 74 carried by opposite faces of the central portions of a pair of annular guide rails or plates 76 and 78. Rigidly secured to the rear wall 28, is the vertical leg portion 79 of an angle support 80. The upper edge 82 of the leg portion 79 is turned inwardly and is fixed to a pair of spaced, substantially horizontally disposed, U-shaped guides 84 and 86 that slidably and frictionally engage the outer edges of the guide wheels 76 and 78, as best shown in Figure 6 of the drawings.

The angulated support 80 is integrally formed with a forwardly extending offset horizontal extension 88 which terminates in a vertical ear or bearing 90 that cooperates with a further vertical ear or bearing 92 carried by the extension 88 to rotatably support a substantially horizontal lower shaft 94 having a stop washer 96 fixed thereon to limit the sliding movement of the shaft relative to the bearings 90 and 92. Fixed on the rearwardly disposed end of the shaft 94, is an externally toothed plate or annular gear 98 that engages a rack bar or the arcuately toothed surface 100 formed on the lower face of the block 68. The forward end of the shaft 94 is fixed adjacent the lower end of a vertically disposed, swingable pointer arm 102 the upper end 104 of which is spaced between the window pane 32 and the plate 34, to register with the lower indicia 38 on the plate 34. The lower end 106 of the pointer arm 102 supports a weight 108 that tends to retain the arm 102 vertical and in registry with the zero graduation of the indicia 38.

Fixed by welding or the like to the inner face of the rear wall 28, beneath the angulated support 42, is an enlarged angulated support block 110 the free end 112 of which is rigidly secured to a depending bifurcated bearing member 114, the furcations 116 of which rotatably support a horizontally disposed upper shaft 118. Fixed to one end of the shaft 118, is a bevelled gear 120, and fixed to the opposite end of the shaft 118 is an adjustable and removable counterweight 122.

Rigidly mounted on a further pointer arm 124, adjacent the lower end 126 thereof, is a bevelled gear 128 that engages the bevelled gear 120 carried by the shaft 118. The gear 128 is fixed to a shaft 129 that is rotatably supported in a further bifurcated member 131 that depends from the end 112 of the angulated support 110 and adjacent the bifurcated member 114. To position the gear 128 into engagement with the gear 120, there is provided a fixed sleeve 130 on the shaft 118 between the furcations 116 of member 114. The upper portion 132 of the latest pointer arm 124 is offset and terminates in a hook 134 that loosely extends over the upper edge of the plate 34 to register with the upper indicia 36 on the said plate 34. The lower end 126 of the pointer arm 124 supports a removable counterweight 136 that aids in the swinging movement of the pointer arm 124.

In practical use of the present invention, the casing 10 is rigidly secured by any suitable means upon a structural element of a ship or the like so that the swinging movement of the pendulum 56 will be parallel to the longitudinal axis of the ship on which the casing 10 is applied. Upon dipping movement of the ship, the pendulum 56 will swing forwardly or rearwardly causing the rack bar 100 to engage and rotate the externally toothed plate 98, thus effecting a swinging movement of the pointer arm 102 relative to the indicia 38 whereby the operator may be informed as to the scaled dipping movement of the ship. It is noted, that the shaft 118 aligns the longitudinal axis of the ship and is perpendicular to the longitudinal axis of the pointer 124, so that upon rocking or rolling movement of the ship, the weight 122 will rock or pivot effecting a rotation of the bevelled gear 120 which engages the gear 128 to effect a swinging movement of the pointer arm 124, whereby the hooked end 134 of the pointer arm 124 will register with the upper indicia 36 on the plate 34.

Obviously, the present level may be suitably attached on an airborne vehicle or any suitable vehicle for use in determining the amount of dipping movement of the vehicle or the amount of rolling or sideward movement of the vehicle without deviating from the scope for which the present invention is intended.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A level comprising a casing, a vertically swingable arm pivoted at its upper end within the casing, a bar secured to the lower end of said arm for swinging movement in an arc with the lower end of said arm and disposed perpendicular to said arm, said bar including an arcuately toothed lower edge, a pointer arm supporting shaft in the casing, a gear on said shaft underlying said bar and meshing with the toothed edge of said bar, a pair of guides within the casing, said bar having bifurcated end portions, a pair of horizontal rollers, an upstanding and a depending conical projection on each roller, said projection engaging the furcations of said bifurcated end portions, and a pair of guides engaging said rollers throughout swinging movement of the bar with the arm.

2. A level comprising a casing having a window opening therein, a graduated plate fixed in the housing behind and in registry with the window opening, first and second spaced parallel vertically swingable pendulums in the casing, said first pendulum including an end extending across the graduated plate and forming a pointer, said first pendulum including a pivot underlying the second pendulum, a rack bar at the lower end of the second pendulum and comprising the weighted end of the pendulum, a gear secured to the pivot of said first pendulum and meshing with said rack bar, a pair of guides secured in the casing, and anti-friction elements at the ends of said bar engaging the guides throughout swinging movement of the second pendulum.

3. The combination of claim 2 wherein said bar includes horizontally bifurcated end portions forming upper and lower furcations at each end of the bar, said anti-friction elements comprising horizontal wheels located between said upper and lower furcations, upper and lower conical lugs having their bases secured to the upper and lower faces, respectively, of said wheels, said upper and lower furcations having registering apertures receiving the tapered ends of said conical lugs.

4. A level comprising a casing having upper and lower portions with a window opening in said upper portion, a graduated plate fixed in said casing behind and in registry with the window opening, a bracket secured in the casing at the lower portion thereof, a horizontal shaft rotatably supported on the bracket, a first pendulum secured adjacent its lower end to one end of the shaft, the upper end of said first pendulum terminating in a pointer that extends across the graduated plate, a gear secured to the horizontal shaft, a second pendulum paralleling the first pendulum and having its upper end pivotally mounted at the upper portion of the casing, a rack bar comprising the weighted lower end of the second pendulum and meshing with the gear, guide channels forming part of said bracket, and anti-friction elements at the ends of said bar engaging said channels throughout movement of said second pendulum about its pivot.

JACK W. SIMS.

References Cited in the file of this patent

UNITED STATES PATENTS

| Number | Name | Date |
|---|---|---|
| 404,947 | Arnold | June 11, 1889 |
| 477,187 | Elbe | June 14, 1892 |
| 782,779 | Deck | Feb. 14, 1905 |
| 1,193,758 | Bradshaw | Aug. 8, 1916 |
| 1,266,551 | Carstensen | May 21, 1918 |
| 1,290,793 | Shemeley | Jan. 7, 1919 |
| 1,370,233 | Spier | Mar. 1, 1921 |
| 1,737,936 | Mercer | Dec. 3, 1929 |
| 2,042,365 | Stockholm | May 26, 1936 |
| 2,341,809 | Pearson | Feb. 15, 1944 |

FOREIGN PATENTS

| Number | Country | Date |
|---|---|---|
| 19,072 | Great Britain | Aug. 28, 1896 |
| 113,315 | Great Britain | of 1918 |
| 138,221 | Great Britain | of 1920 |
| 577,801 | France | of 1924 |